(12) United States Patent
Turpin et al.

(10) Patent No.: US 7,838,139 B2
(45) Date of Patent: Nov. 23, 2010

(54) FLOW FIELD PLATE GEOMETRIES

(75) Inventors: Mark Christopher Turpin, Windsor (GB); Alan Robert Chapman, Stourport on Severn (GB)

(73) Assignee: The Morgan Crucible Company PLC (GB)

( * ) Notice: Subject to any disclaimer, the term of this patent is extended or adjusted under 35 U.S.C. 154(b) by 32 days.

(21) Appl. No.: 10/516,216

(22) PCT Filed: Jun. 18, 2003

(86) PCT No.: PCT/GB03/02621

§ 371 (c)(1), (2), (4) Date: Nov. 30, 2004

(87) PCT Pub. No.: WO04/001874

PCT Pub. Date: Dec. 31, 2003

(65) Prior Publication Data

US 2005/0221152 A1   Oct. 6, 2005

(30) Foreign Application Priority Data

Jun. 24, 2002   (GB) ................................ 0214522.5

(51) Int. Cl.
*H01M 8/04*   (2006.01)
(52) U.S. Cl. .................. 429/34; 429/456; 429/457; 429/512; 429/514
(58) Field of Classification Search .................. 429/34, 429/38, 39
See application file for complete search history.

(56) References Cited

U.S. PATENT DOCUMENTS

| | | | |
|---|---|---|---|
| 3,278,336 A | 10/1966 | Uline et al. | |
| 3,814,631 A | 6/1974 | Warszawski et al. | |
| 4,615,955 A * | 10/1986 | Amakawa et al. | 429/34 |
| 5,108,849 A | 4/1992 | Watkins et al. | |
| 5,230,966 A | 7/1993 | Voss et al. | |
| 5,269,902 A | 12/1993 | Khandkar et al. | |
| 5,376,472 A | 12/1994 | Hartvigsen et al. | |
| 5,514,486 A | 5/1996 | Wilson | |
| 5,595,834 A | 1/1997 | Wilson et al. | |
| 5,641,586 A * | 6/1997 | Wilson | 429/30 |

(Continued)

FOREIGN PATENT DOCUMENTS

CA   2327962   6/2002

(Continued)

OTHER PUBLICATIONS

Office Action dated Jul. 15, 2009 in related U.S. Appl. No. 10/560,658.

(Continued)

*Primary Examiner*—Patrick Ryan
*Assistant Examiner*—Alix Echelmeyer
(74) *Attorney, Agent, or Firm*—Dean W. Russell; Kristin M. Crall; Kilpatrick Stockton LLP

(57) ABSTRACT

A flow field plate for a fuel cell or electrolyser comprises on at least one face an assembly of channels comprising one or more gas delivery channels, one or more gas removal channels, and a permeable wall separating same. The permeable wall may comprise a plurality of gas diffusion channels.

19 Claims, 7 Drawing Sheets

U.S. PATENT DOCUMENTS

| | | | |
|---|---|---|---|
| 5,686,199 | A | 11/1997 | Cavalca et al. |
| 5,728,446 | A | 3/1998 | Johnston et al. |
| 5,773,160 | A | 6/1998 | Wilkinson et al. |
| 5,945,232 | A | 8/1999 | Ernst et al. |
| 6,007,933 | A | 12/1999 | Jones |
| 6,037,073 | A | 3/2000 | Besmann et al. |
| 6,071,635 | A | 6/2000 | Carlstrom, Jr. |
| 6,087,033 | A | 7/2000 | Grune et al. |
| 6,207,312 | B1 | 3/2001 | Wynne et al. |
| 6,251,534 | B1 | 6/2001 | McElroy |
| 6,361,892 | B1 | 3/2002 | Ruhl et al. |
| 6,541,145 | B2 * | 4/2003 | Wilkinson et al. ............ 429/34 |
| 6,555,261 | B1 | 4/2003 | Lewinski et al. |
| 6,569,554 | B1 | 5/2003 | Doggwiler et al. |
| 6,686,082 | B2 | 2/2004 | Leger et al. |
| 6,686,084 | B2 * | 2/2004 | Issacci et al. ................ 429/34 |
| 2001/0005557 | A1 | 6/2001 | Yosida et al. |
| 2002/0192531 | A1 | 12/2002 | Zimmerman et al. |
| 2003/0108782 | A1 | 6/2003 | Leger et al. |
| 2003/0129468 | A1 | 7/2003 | Issacci et al. |
| 2004/0023100 | A1 | 2/2004 | Boff et al. |
| 2004/0058218 | A1 | 3/2004 | Atbi et al. |

FOREIGN PATENT DOCUMENTS

| | | |
|---|---|---|
| DE | 10038589 | 2/2002 |
| EP | 0328115 | 8/1989 |
| EP | 0999605 | 5/2000 |
| EP | 1017344 | 7/2000 |
| EP | 1020942 | 7/2000 |
| EP | 1215743 | 6/2002 |
| GB | 2372143 | 8/2002 |
| GB | 2372144 | 8/2002 |
| GB | 2372626 | 8/2002 |
| GB | 2375222 | 11/2002 |
| GB | 2387476 | 10/2003 |
| GB | 2403061 | 12/2004 |
| JP | 58-164156 | 9/1983 |
| JP | 61-256568 | 11/1986 |
| JP | 64-63271 | 3/1989 |
| JP | 3-276569 | 12/1991 |
| JP | 06084526 A * | 3/1994 |
| JP | 6-267564 | 9/1994 |
| JP | 7-288133 | 10/1995 |
| JP | 8-45520 | 2/1996 |
| JP | 10 032012 | 2/1998 |
| JP | 11 016590 | 1/1999 |
| JP | 11 016591 | 1/1999 |
| WO | WO94/11912 | 5/1994 |
| WO | WO94/21372 | 9/1994 |
| WO | WO97/42672 | 11/1997 |
| WO | WO97/50139 | 12/1997 |
| WO | WO98/52242 | 11/1998 |
| WO | WO99/09923 | 3/1999 |
| WO | WO00/26981 | 5/2000 |
| WO | WO00/41260 | 7/2000 |
| WO | WO01/04982 | 1/2001 |
| WO | WO01/31728 | 5/2001 |
| WO | WO01/41231 | 6/2001 |
| WO | WO01/41239 | 6/2001 |
| WO | WO01/89019 | 11/2001 |
| WO | WO02/17419 | 2/2002 |
| WO | WO02/37592 | 5/2002 |
| WO | WO02/065566 | 8/2002 |
| WO | WO02/069426 | 9/2002 |
| WO | WO02/090053 | 11/2002 |
| WO | WO03/096453 | 11/2003 |
| WO | WO03/096454 | 11/2003 |
| WO | WO03/096455 | 11/2003 |
| WO | WO03/096466 | 11/2003 |
| WO | WO2004/001874 | 12/2003 |
| WO | WO2004/114446 | 12/2004 |

OTHER PUBLICATIONS

Response dated Oct. 14, 2009 in related U.S. Appl. No. 10/560,658.
Office Action dated Feb. 4, 2010 in related U.S. Appl. No. 10/560,658.
Response dated Jun. 4, 2010 in related U.S. Appl. No. 10/560,658.
Office Action dated Aug. 13, 2010 in U.S. Appl. No. 10/560,658.

* cited by examiner

FLOW FIELD PLATE GEOMETRIES

CROSS REFERENCE TO RELATED APPLICATIONS

This application is the U.S. national phase of International Application No. PCT/GB2003/002621 filed on Jun. 18, 2003 and published in English as International Publication No. WO 2004/001874 A2 on Dec. 31, 2003, which application claims priority to Great Britain Application No. 0214522.5 filed on Jun. 24, 2002, the contents of which are incorporated by reference herein.

This invention relates to fuel cells and electrolysers, and is particularly, although not exclusively, applicable to proton exchange membrane fuel cells and electrolysers.

Fuel cells are devices in which a fuel and an oxidant combine in a controlled manner to produce electricity directly. By directly producing electricity without intermediate combustion and generation steps, the electrical efficiency of a fuel cell is higher than using the fuel in a traditional generator. This much is widely known. A fuel cell sounds simple and desirable but many man-years of work have been expended in recent years attempting to produce practical fuel cell systems. An electrolyser is effectively a fuel cell in reverse, in which electricity is used to split water into hydrogen and oxygen.

Both fuel cells and electrolysers are likely to become important parts of the so-called "hydrogen economy". In the following, reference is made to fuel cells, but it should be remembered that the same principles apply to electrolysers. One type of fuel cell in commercial production is the so-called proton exchange membrane (PEM) fuel cell [sometimes called polymer electrolyte or solid polymer fuel cells (PEFCs)]. Such cells use hydrogen as a fuel and comprise an electrically insulating (but ionically conducting) polymer membrane having porous electrodes disposed on both faces. The membrane is typically a fluorosulphonate polymer and the electrodes typically comprise a noble metal catalyst dispersed on a carbonaceous powder substrate. This assembly of electrodes and membrane is often referred to as the membrane electrode assembly (MEA).

Hydrogen fuel is supplied to one electrode (the anode) where it is oxidised to release electrons to the anode and hydrogen ions to the electrolyte. Oxidant (typically air or oxygen) is supplied to the other electrode (the cathode) where electrons from the cathode combine with the oxygen and the hydrogen ions to produce water. A sub-class of proton exchange membrane fuel cell is the direct methanol fuel cell in which methanol is supplied as the fuel. This invention is intended to cover such fuel cells and indeed any other fuel cell.

In commercial PEM fuel cells many such membranes are stacked together separated by flow field plates (also referred to as bipolar plates or separators). The flow field plates are typically formed of metal or graphite to permit good transfer of electrons between the anode of one membrane and the cathode of the adjacent membrane. The flow field plates have a pattern of grooves on their surface to supply fluid (fuel or oxidant) and to remove water produced as a reaction product of the fuel cell.

Various methods of producing the grooves have been described, for example it has been proposed to form such grooves by machining, embossing or moulding (WO00/41260), and (as is particularly useful for the present invention) by sandblasting through a resist (WO01/04982).

International Patent Application No. WO01/04982 disclosed a method of machining flow field plates by means of applying a resist or mask to a plate and then using sandblasting (or other etching method using the momentum of moving particles to abrade the surface, e.g. waterjet machining), to form features corresponding to a pattern formed in the mask or resist.

Such a process was shown by WO01/04982 as capable of forming either holes through the flow field plates, or closed bottom pits or channels in the flow field plates. The process of WO01/04982 is incorporated herein in its entirety, as giving sufficient background to enable the invention.

In practice, the majority of plates made to date have been formed by milling the channels.

WO00/41260 discloses a flow field geometry in which substantially straight parallel channels are provided of a width less than about 0.75 mm.

WO00/26981 discloses a similar geometry in which highly parallel flow channels of a width less than 800 μm separated by lands of less than 800 μm are used and in which the inter-channel land area is less than 25% of the flow field. Preferred land widths are narrower still. This geometry is stated to improve gas distribution as reducing the need for lateral gas dispersion through the MEA (referred to in WO00/26981 as the DCC [diffusion current collectors]). The geometry is also stated to reduce electrical resistance as it reduces the electrical path length to land areas.

There is a conflict between electrical and gas properties described in WO00/26981, in that reduced land areas are stated to increase electrical resistance. WO00/26981 states that these conflicting requirements may be optimised. WO00/26981 states that the pattern of highly parallel micro-channels may contain interconnections or branch points such as in hatchings or grid patterns. One advantage of the use of narrow channels is stated to be that this encourages water droplet formation across the channels so permitting efficient water removal. However this advantage may not be seen where a grid pattern is used as the pressure either side of a water droplet is likely to be substantially equal.

Cited against WO00/26981 are:—
  U.S. Pat. No. 3,814,631, which discloses an electrode construction in which micro-channels of more than 0.3 mm wide are provided in a frame edge leading to a textured electrode in which protrusions on one face of the electrode match depressions in the opposed face of the electrode.
  U.S. Pat. No. 5,108,849, which discloses a plate having serpentine tracks of 0.76 mm (0.03 inch) width or more with land widths of 0.254 mm (0.01 inch) or more.
  WO94/11912, which discloses a plate having discontinuous tracks of 0.76 mm (0.03 inch) width and depth. These tracks may be interdigitated.
  WO98/52242, which discloses means for humidifying the membrane, Narrow channels are known for other devices, for example, WO94/21372 discloses a chemical processing apparatus comprising a three dimensional tortuous channel formed by aligning part channels in adjacent discs. Such a construction has not been used for a fuel cell.

None of the fuel cell related patents disclose a structure of relatively coarse gas delivery channels leading to fine gas channels.

To ensure that the fluids are dispersed evenly to their respective electrode surfaces, a so-called gas diffusion layer (GDL) is placed between the electrode and the flow field plate. The gas diffusion layer is a porous material and typically comprises a carbon paper or cloth, often having a bonded layer of carbon powder on one face and coated with a hydrophobic material to promote water rejection. It has been proposed to provide an interdigitated flow field below a macroporous material (U.S. Pat. No. 5,641,586) having connected porosity of pore size range 20-100 μm allowing a reduction in size of the gas diffusion layer. Such an arrangement permits gas flow around blocked pores, which is disadvantageous. Build up of reactant products (such as water) can occur in these pores reducing gas transport efficiency. Additionally, such a structure increases the thickness of the flow field plate.

The applicant has analysed what happens in a fuel cell and have come to the conclusion that the gas diffusion layer does not do what its name implies. The theory had been that the gas diffusion layer serves to permit gas to diffuse across the whole surface of the membrane so that large portions of the membrane are active in the cell reaction. The applicant has found that, in simple models, the gas appears not to access the whole of the lands between the channels, but only the area above the channels and a small margin surrounding the channels, the majority of the electricity generation taking place in this restricted region.

This is supported by the observation that interdigitated channels show higher electrical efficiencies since the gas is forced into the areas above the lands. The gas diffusion layer does however actually serve a useful purpose in carrying current from those areas of the membrane electrode above the channels to the lands, and in providing mechanical support to the membrane electrode to prevent it being squeezed into the channels. It has been proposed by some to stiffen the membrane electrode.

The gas diffusion layer in carrying current from those areas where electricity is generated to the lands, does of course result in electrical losses due to the electrical resistance of the gas diffusion layer. Present day gas diffusion layers are chosen as a delicate balance between the needs of mechanical strength, electrical conductivity, and gas permeability.

A combined flow field plate and gas diffusion layer has been described in U.S. Pat. No. 6,037,073 and comprises a selectively impregnated body of porous carbon material, the impregnation hermetically sealing part of the plate. Such an arrangement has the drawbacks that it is complicated to make reproducibly and that it permits gas flow around blockages as in U.S. Pat. No. 5,641,586.

An assembled body of flow field plates and membranes with associated fuel and oxidant supply manifolds is often referred to a fuel cell stack.

Although the technology described above has proved useful in prototype and in some limited commercial applications, to achieve wider commercial acceptance there is now a demand to reduce the physical size of a fuel cell stack and to reduce its cost. Accordingly, a reduction in the number of components could have beneficial results on size and cost (both through material and assembly costs).

Also, the prior art flow field plates have provided flow fields of matrix, serpentine, linear, or interdigitated form but have not looked to other physical systems for improving the gas flow pathways. Matrix flow fields (in which a grid of lands is provided to support the gas diffusion layer and gas flows between the lands) theoretically provide good gas flow but in practice have the disadvantage that water is readily trapped within the matrix and blocks it. Further, any blockage can lead to stagnant areas in the flow field.

Linear and serpentine flow fields have fewer problems with water blockage or stagnant areas but have a lower gas flow for a given pressure drop across the flow field. Serpentine flow field patterns also tend to have a problem with gas "short circuiting" by passing from one channel to an adjacent channel having a significantly lower pressure.

Interdigitated flow fields provide a highly efficient delivery of gas but have the disadvantage that high pressures are required to force the gas from the incoming flow field, through the gas diffusion layer, to the outgoing flow field and this results in high parasitic losses.

Additionally, the applicant has modelled the behaviour of conventional flow field plate designs and found that under conditions of high demand (e.g. currents of 0.6 A/cm$^2$ or higher) such conventional plates are liable to depletion of oxidant and/or fuel over large parts of the flow field plate.

Known requirements of gas flow fields are:— sufficient land area to support the GDL and maintain a cavity for flow of gas sufficiently narrow channels to prevent the GDL squeezing into and blocking the channels under the compressive pressures holding the stack together and, from WO00/26981, sufficiently narrow channels to reduce the path length of current from areas over the channel to lands, and sufficiently narrow lands to reduce the diffusion distance of gas to areas over the lands.

What WO00/26981 does not solve, except by partition of flow field plates into separate areas, is that narrow channels imply a high pressure drop and so a distinct difference in gas availability from one end of the channels to the other.

In a conventional flow field plate design, the pressure at one end (the inlet end) of the flow field is significantly lower than at the other end (the outlet end) as reactant gases are both consumed in operation of the fuel cell and because of the resistance to flow of the gases. As the demand for fuel or oxidant increases, the ability of such arrangements to deliver reactant gas effectively towards the reactant gas outlet diminishes. The applicant has realised that what is required is a means to provide efficient gas delivery to the whole of the working surface of the fuel cell, and in particular in the region of the flow field outlet, so that starvation of reactants does not occur.

The applicant has realised that by looking to physiological systems (the lung) improved flow field geometries may be realised that are likely to have lower parasitic losses due to their shorter gas flow pathways. In the geometries contemplated, gas is delivered by gas delivery channels to a permeable wall, and is then transferred through the permeable wall to gas removal channels.

The applicant has also realised that such geometries are less likely to suffer from gas short-circuiting, since such an arrangement permits high flow rates at low pressure drops. Such geometries also promise more even distribution of reactants over the flow field.

Accordingly, the present invention provides a flow field plate for a fuel cell or electrolyser, comprising one or more gas delivery channels, one or more gas removal channels, and a permeable wall separating same.

The permeable wall may comprise a plurality of gas diffusion channels and may be of impermeable material.

The permeable wall may be of convoluted form.

The permeable wall may have a length of 10 or more times the maximum width of the flow field.

Further features of the invention are set out in the claims and as exemplified by the following description with reference to the drawings in which:

Figure 1:
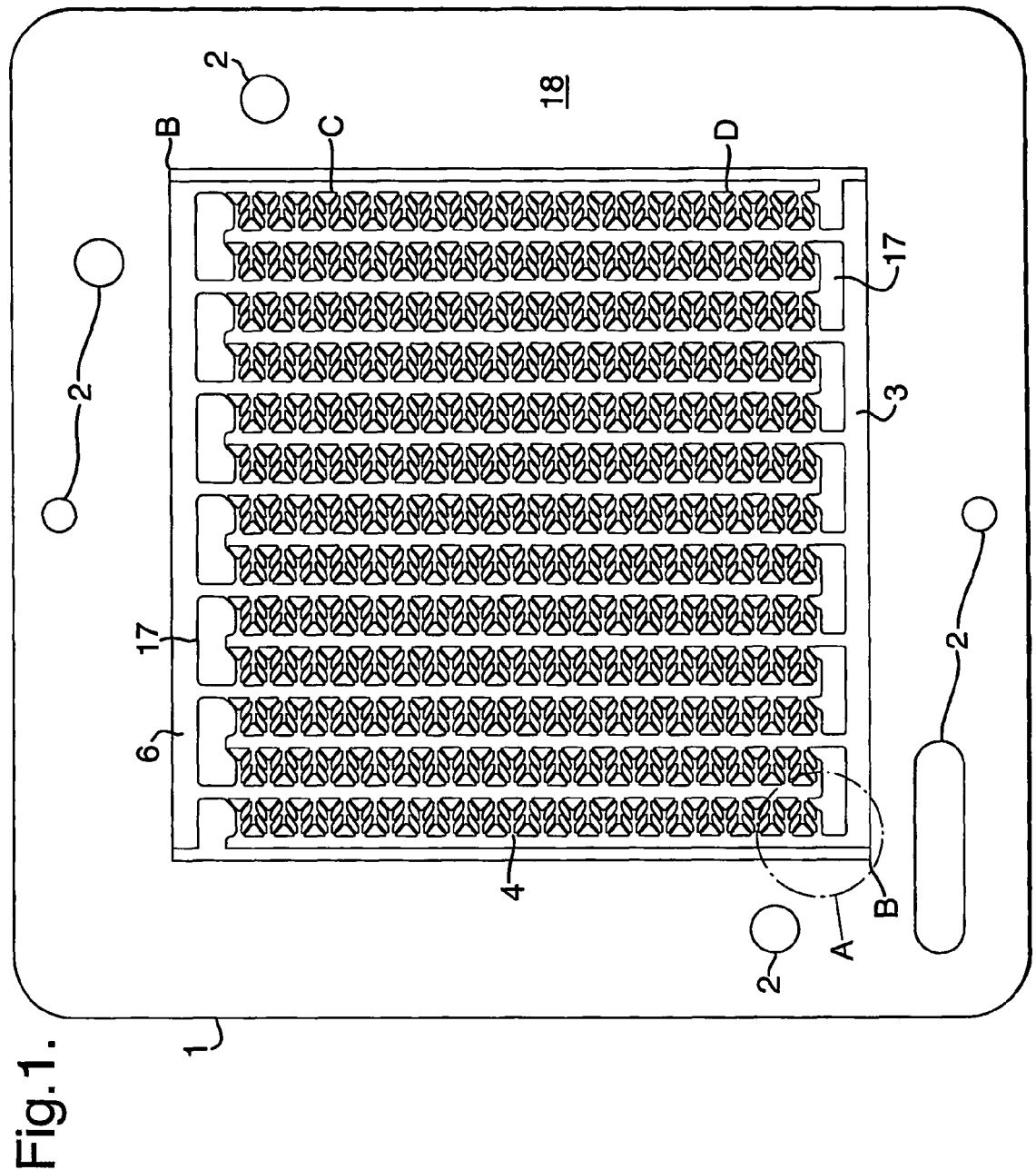
FIG. 1 shows in plan a flow field plate design in accordance with the invention.
Figure 2:
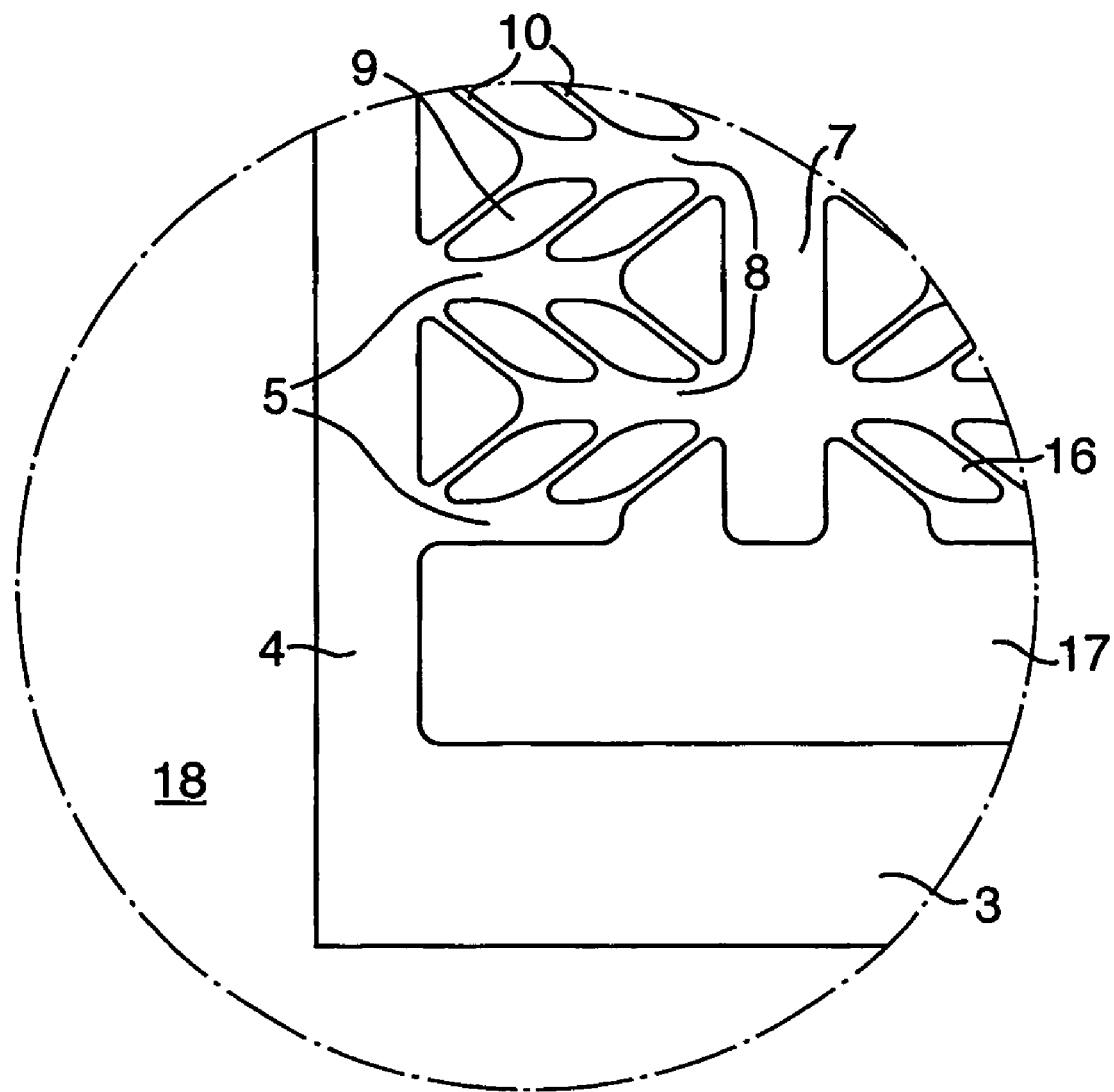
FIG. 2 shows an enlarged plan view of area A of FIG. 1.

FIGS. 1 and 2 show a flow field plate in accordance with the invention. A flow field plate 1 comprises manifolds and fastening holes 2 in a peripheral frame 18 that forms no part of the actual flow field. The plate also comprises a gas supply channel 3 to which a reactant gas is delivered by a manifold (not shown). Channel 3 communicates with gas delivery channels 4. Gas delivery channels 4 themselves connect to gas delivery sub-channels 5. In similar manner, a gas drain channel 6 connects with gas removal channels 7 and gas removal sub-channels 8.

The gas delivery channels and sub channels 4,5 and the gas removal channels and sub-channels 7,8 define between them a wall 9 having a plurality of diffusion channels 10 that offer a flow path from the gas delivery channels and sub channels 4,5 to the gas removal channels and sub-channels 7,8. In a typical case, for a small fuel cell having a plate size of ~10 cm×10 cm and a flow field working area of ~~6.5 cm×6.5 cm, the width of the gas delivery channels would be about 1.25 mm, for the sub-channels about 0.5 mm, and for the diffusion channels about 0.125 mm.

The wall is convoluted on two scales.

On a first scale, it extends in a pleated or concertinaed manner from the gas supply channel 3 to the gas drain channel 6 and comprises wall segments 16 along each fold of the wall, and end wall segments 17 at each turn of the wall. The length of each fold of the wall is about 6 cm in the example shown.

On a second scale, the walls between end wall segments 17 are themselves pleated or concertinaed to form the gas delivery and gas removal sub channels 5,8. The length of the gas delivery and gas removal sub-channels is about 2.5 mm in the example shown.

This pattern can be repeated on a smaller or larger scale still.

This fractal type arrangement of the flow field, in which gas passes through progressively diminishing channels, means that the arrangement is to some extent scalable to the size of the flow field plate. It further ensures a large surface area to the permeable wall.

This arrangement also ensures that the GDL is well supported by the flow field while ensuring that parts of the MEA lying above the land areas of the flow field are only a short distance from a channel (typically, for the arrangement shown, for the wall segments 16, within 0.5 mm or less of the closest channel and for end wall segment 17, within 1.25 mm or less). This arrangement is readily scalable such that smaller wall segments 16 may be used giving still better access of gas to the area above the lands. Preferably no part of the flow field (and in particular of the wall segment 16) is more than 0.25 mm from the closest gas delivery or diffusion channel.

The flow field can be considered as a series of low flow resistance gas delivery channels (4,5) connected to a series of low flow resistance gas removal channels (7,8) by a permeable membrane 9 which may be formed by a series of high flow resistance channels 10 in an impermeable wall.

The flow field may also be considered as a series of gas delivery channels (4,5) delivering gas to regions distributed across the face of the flow field, a series of gas removal channels (7,8) removing gas from regions distributed across the face of the flow field, and a permeable wall controlling the rate of transfer of gas from said gas delivery channels (4,5) to said gas removal channels (7,8).

The corners of the flow field segments are preferably rounded so as to reduce the points for nucleation and/or adherence of water droplets.

In the flow field shown, the length of the wall 9 is considerably longer than the maximum width of the flow field (the diagonal B-B) being at least 10 times greater.

The applicant has modelled a test plate of the above dimensions with a plate having the same flow field working area and having the same proportion of land area to channels but having a five channel serpentine configuration. The modelling indicated that for a given flow rate the serpentine channel flow field had a pressure drop of 200 Pa whereas the plate according to the invention had a pressure drop of 53 Pa. While both pressure drops are small, in a large system such a difference in pressure drop could have an appreciable effect on parasitic losses, reducing the energy requirement for the inventive design in comparison with the serpentine design.

Figure 3:
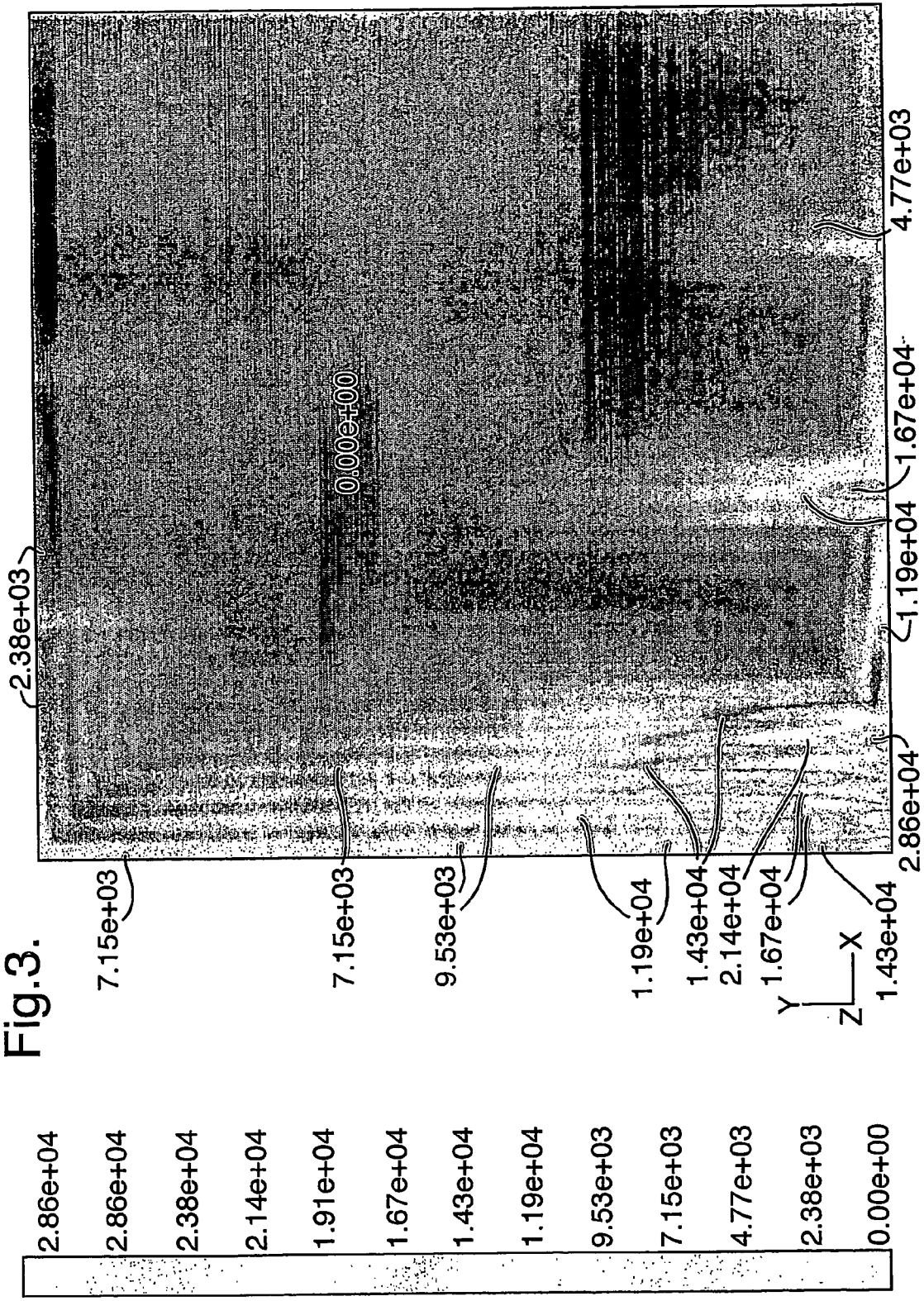
FIG. 3 shows the results of modelling a five track serpentine flow field.
Figure 4:
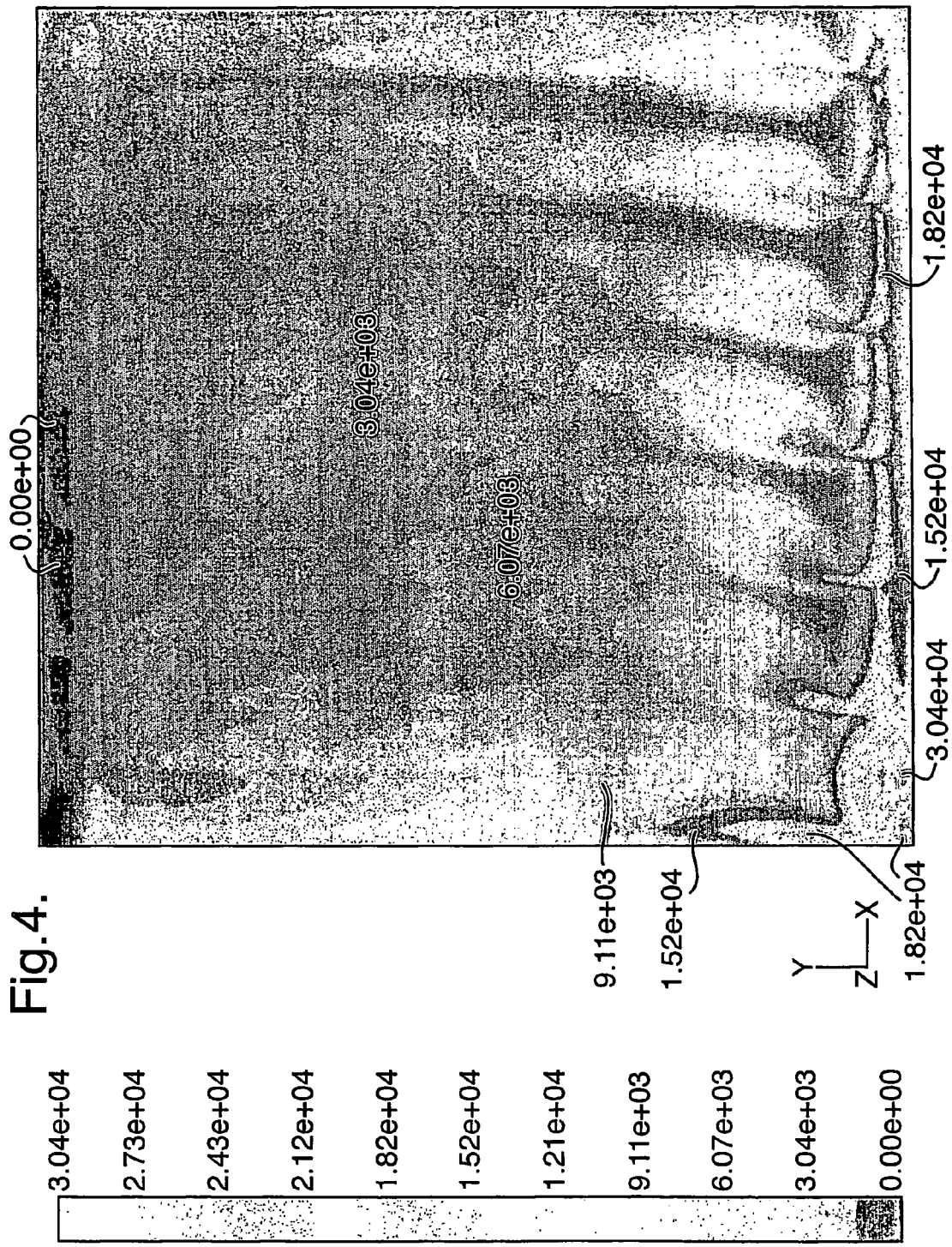
FIG. 4 shows the results of modelling a flow field in accordance with the present invention and the design of FIGS. 1 & 2.

Additionally, at high currents, the serpentine arrangement showed a significant diminution in gas flow towards the outlet as shown by FIG. 3 in which the darker areas show that the majority of the plate is starved of reactants. In contrast, under the same conditions, the inventive arrangement showed less of a loss in gas flow and so is able to sustain current generation over more of the plate.

To reduce such loss as was present, the applicant provides wider diffusion channels toward the outlet ends of the plate (region C) than near the inlet ends of the plate (region D) and indeed the channel widths and/or depths can be varied along the length of the permeable wall as required to provide a uniform flow across the plate.

Alternatively, or additionally, the number of gas diffusion channels per unit length can vary along the length of the permeable wall, so as to provide more channels in regions that would otherwise be depleted in gas were constant numbers of channels per unit length used.

Additionally, some or all of the gas diffusion channels may be convoluted to provide a tortuous path and so higher resistance to gas flow. The proportion of convoluted channels and/or their degree of convolution may be varied along the length of the permeable wall as required.

To form both gas delivery and gas diffusion channels a technique such as sand blasting may be used in which a patterned template or resist is placed against the surface of a plate, the template or resist having a pattern corresponding to the desired channel geometry. Such a technique is described in WO01/04982, which is incorporated herein in its entirety as enabling the present invention. With this technique the plates may be formed from a graphite/resin composite or other non-porous electrically conductive material that does not react significantly with the reactants used.

Figure 5:
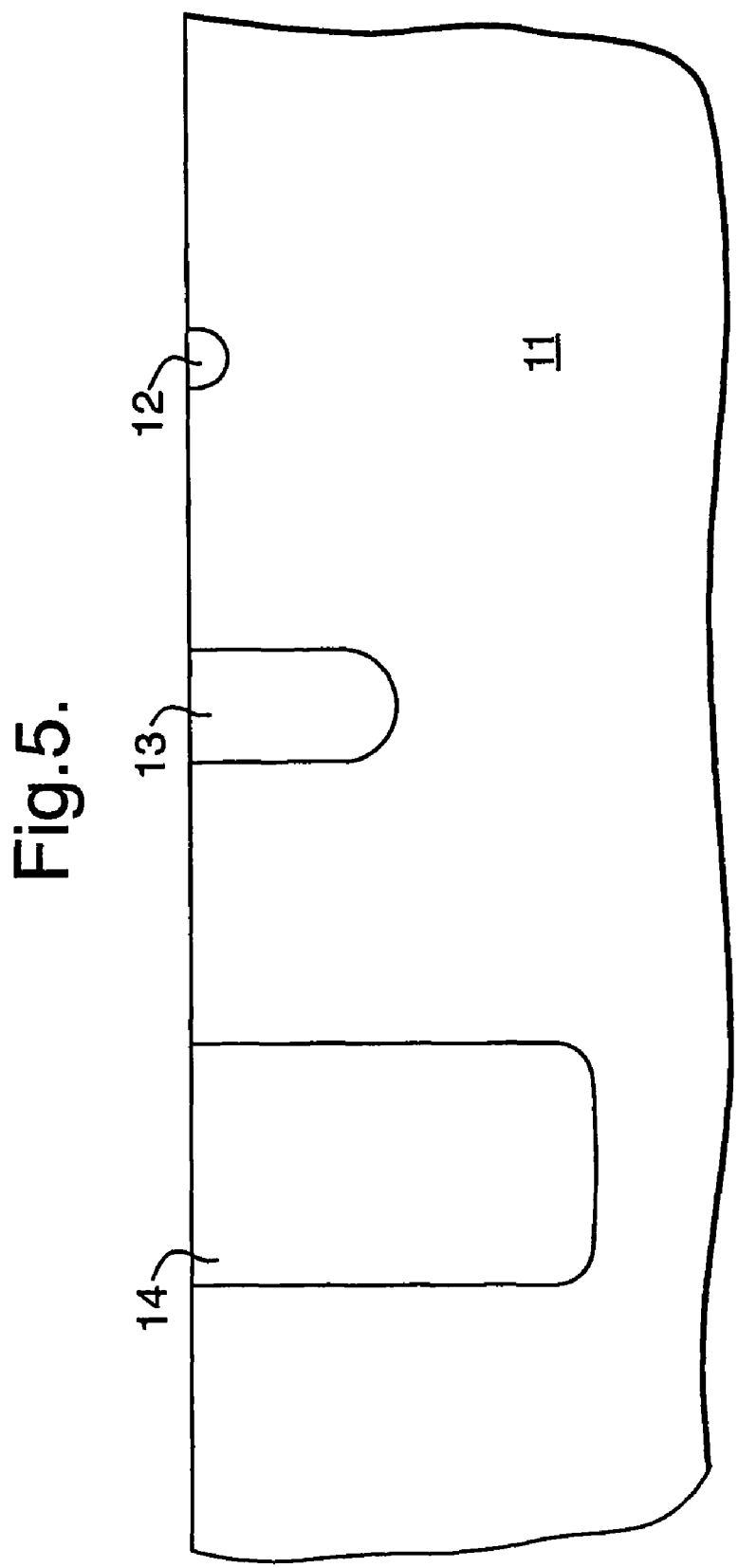
FIG. 5 shows the results of using an abrasive blasting technique FIG. 6 show an alternative a flow field plate design in accordance with the invention

It is found with this technique that the profiles of channels of different width vary due to the shadow cast by the mask. FIG. 5 shows a flow field plate 11 having a narrow channel 12 formed in its surface. Because of the shadowing effect of the resist used in forming the channel the channel is exposed to sandblast grit coming effectively only from directly above. This leads to a generally semicircular profile to the channel and to a shallow cutting of the channel.

For progressively larger channels (13 and 14) the resist casts less of a shadow allowing sandblasting grit from a progressively wider range of angles to strike the surface of the flow field plate, so allowing both deeper cutting of the surface and a progressively flatter bottom to the channel.

Accordingly, by applying a resist with different width channels to a plate and exposing the plate and resist to sandblasting with a fine grit, a pattern of channels of different widths and depths can be applied.

This is advantageous in the present context, as the channels in the wall do not need to be of the same depth as the gas delivery channels, and indeed are functioning as a choke to restrict gas flow through the wall.

Alternatively, the wall could be deposited onto a plate (e.g. by screen printing or the like) and in this case could be formed of a gas permeable material without the use of gas diffusion channels. It will be readily apparent to the person skilled in the art that there are many ways of producing a permeable wall.

While the wall 9 shown is defined by gas channels and sub-channels, it is readily apparent that more or less convoluted walls can be used.

Figure 6:
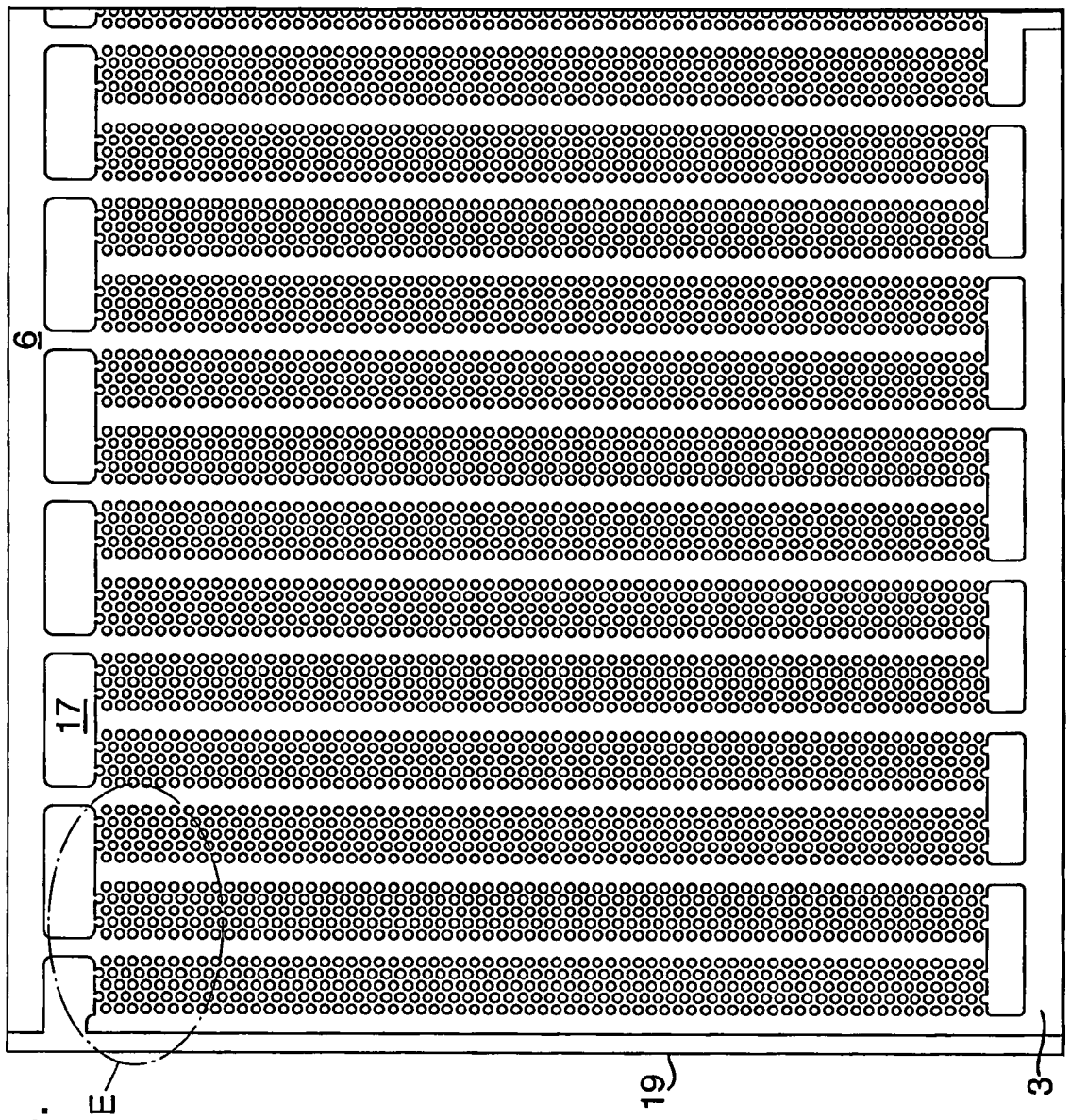
Figure 7:
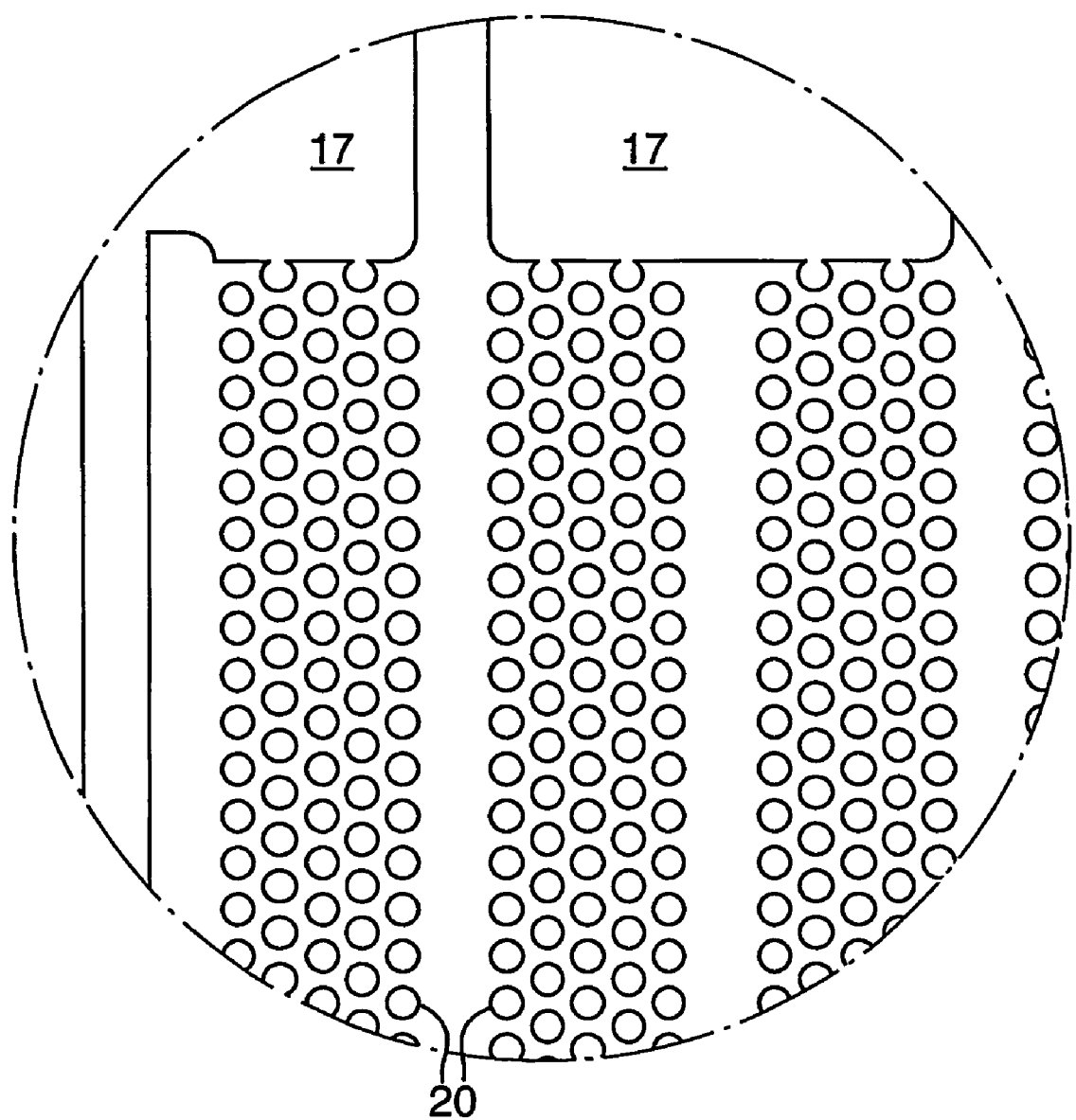
FIG. 7 shows an enlarged plan view of area E of FIG. 1.

FIGS. 6 and 7 show an alternative flow field plate design in accordance with the principles of the present invention. A flow field plate comprises a central area 19 (for use with a surrounding frame 18 [not shown] as in FIG. 1). This has a gas supply channel 3 and a gas drain channel 6 and end wall segments 17 as in FIG. 1. The permeable walls are defined by an array of lands 20 forming a network of fine gas diffusion channels therebetween. Although circular lands are shown, the applicant has found that hexagonal or other lands offering a relatively constant channel width therebetween are preferred.

The present invention thereby presents a flow field that promises:—
- higher gas flow for a given pressure drop than a linear or serpentine flow field of the same land area;
- comparable gas flow to a matrix flow field while providing a sufficient pressure drop to clear water
- comparable performance to an interdigitated flow field without the high parasitic losses normally associated with same.

The invention claimed is:

1. A flow field plate separator for a fuel cell or electrolyser comprising on at least one face a series of gas delivery channels interdigitated with a series of gas removal channels, and permeable walls separating same, wherein the permeable walls are gas permeable walls comprising a plurality of distinct, impermeable wall segments separated by a plurality of gas diffusion channels such that the gas permeable walls are adapted to transfer gas from the gas delivery channels to the gas removal channels during operation of the fuel cell or electrolyser.

2. A flow field plate separator as claimed in claim 1, in which no part of the permeable walls is more than 1.25 mm from a gas diffusion channel.

3. A flow field plate separator as claimed in claim 1, in which the permeable walls are of convoluted form.

4. A flow field plate separator as claimed in claim 3, in which the permeable walls are concertinaed, have wall segments extending along each fold of the wall, and end wall segments at each turn of the wall.

5. A flow field plate separator as claimed in claim 4, in which the maximum distance from any part of a wall segment of the flow field to the nearest gas delivery or gas diffusion channel is less than 1.25 mm.

6. A flow field plate separator as claimed in claim 4, in which the maximum distance from any part of a wall segment extending along each fold of the permeable wall to the nearest gas delivery or gas diffusion channel is less than 0.5 mm.

7. A flow field plate separator as claimed in claim 3, in which the permeable walls are convoluted on two or more scales.

8. A flow field plate separator as claimed in claim 1, in which the maximum distance from any part of a wall segment of the flow field to the nearest gas delivery or gas diffusion channel is less than 0.25 mm.

9. A flow field plate separator as claimed in claim 1, in which the permeable walls have a length of 10 or more times the maximum width of the flow field.

10. A flow field plate separator as claimed in claim 1, in which corners of the plurality of wall segments are rounded.

11. A flow field plate separator as claimed in claim 1, in which the permeability of the permeable walls varies along their length so as to provide a more even distribution of gas than using constant permeability permeable walls.

12. A flow field plate separator as claimed in claim 11, in which the width and/or depth of the gas diffusion channels varies along the length of the permeable walls.

13. A flow field plate separator as claimed in claim 11, in which the number of gas diffusion channels per unit length varies along the length of the permeable walls.

14. A flow field plate separator as claimed in claim 11, in which some or all of the gas diffusion channels are convoluted to provide a tortuous path.

15. A flow field plate separator as claimed in claim 14, in which the proportion of the convoluted gas diffusion channels is varied along the length of the permeable walls.

16. A flow field plate separator as claimed in claim 14, in which the degree of convolution of the convoluted gas diffusion channels is varied along the length of the permeable walls.

17. A flow field plate separator as claimed in claim 1, in which the plurality of walls segments of the permeable walls are defined by an array of lands forming a network of fine gas diffusion channels therebetween.

18. A method of making a flow field plate separator as claimed in claim 1, by applying a patterned resist having different width channels to a plate and exposing the plate and resist to sandblasting with a fine grit, to produce a pattern of channels of different widths and depths in the flow field plate.

19. The flow field plate separator as claimed in claim 1, wherein the series of gas delivery channels comprise low flow resistance gas delivery channels, the series of gas removal channels comprise low flow resistance gas removal channels, and the plurality of wall segments of the permeable walls define a series of high flow resistance channels in a wall of impermeable material.

* * * * *